United States Patent
Zhu et al.

(10) Patent No.: US 11,182,739 B2
(45) Date of Patent: Nov. 23, 2021

(54) CARRIER TRACKING SYSTEM AND METHOD THEREOF

(71) Applicant: DELTA ELECTRONICS, INC., Taoyuan (TW)

(72) Inventors: Zi-Yu Zhu, Taoyuan (TW); Choon-Meng Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 16 days.

(21) Appl. No.: 16/142,000

(22) Filed: Sep. 26, 2018

(65) Prior Publication Data

US 2019/0318301 A1 Oct. 17, 2019

(30) Foreign Application Priority Data

Apr. 16, 2018 (CN) .......................... 201810337359.6

(51) Int. Cl.
*G06Q 10/08* (2012.01)
*G06K 7/14* (2006.01)

(52) U.S. Cl.
CPC ......... *G06Q 10/087* (2013.01); *G06K 7/1413* (2013.01)

(58) Field of Classification Search
CPC .................................................. G06Q 10/087
USPC ....................................................... 235/385
See application file for complete search history.

(56) References Cited

U.S. PATENT DOCUMENTS

| 8,295,974 | B2 | 10/2012 | Andersen et al. | |
| 8,396,755 | B2 | 3/2013 | Bonner et al. | |
| 8,659,420 | B2 | 2/2014 | Salvat, Jr. | |
| 8,774,960 | B2 | 7/2014 | Andersen et al. | |
| 9,200,469 | B1 * | 12/2015 | Mindrum | E04H 13/003 |
| 10,002,342 | B1 * | 6/2018 | Oikarinen | G05D 1/042 |
| 2005/0065861 | A1 | 3/2005 | Bann | |

FOREIGN PATENT DOCUMENTS

| CN | 107066914 A | 8/2017 |
| TW | 201237370 A1 | 9/2012 |
| TW | 201743298 A | 12/2017 |
| WO | 2005027066 A3 | 5/2006 |

* cited by examiner

*Primary Examiner* — Rafferty D Kelly
(74) *Attorney, Agent, or Firm* — CKC & Partners Co., LLC

(57) ABSTRACT

A carrier tracking system is applied to a predetermined space. Carriers with optical recognizable marks are operating in the predetermined space, in which each of the optical recognizable mark is associated with information of materials carried by the carrier. The carrier tracking system includes at least one optical capturing device and a computing unit. The at least one optical capturing device is configured to capture images of the predetermined space. The computing unit is configured to determine an optical recognized coordinate of the optical recognizable mark in the images. The computing unit converts the optical recognized coordinate to a real-space coordinate in the predetermined space. In order to locate the carrier, the computing unit further associates the real-space coordinate with the information of materials carried by the carrier.

9 Claims, 5 Drawing Sheets

CARRIER TRACKING SYSTEM AND METHOD THEREOF

RELATED APPLICATIONS

This application claims priority to China Application Serial Number 201810337359.6, filed on Apr. 16, 2018, which is herein incorporated by reference.

BACKGROUND

Technical Field

Present disclosure relates to a carrier tracking system and method. More particularly, present disclosure relates to a carrier tracking system and method applied to a predetermined space.

Description of Related Art

In order to establish an effective material handling operation for manufacturers, automatic systems for inventory control, material collection, material listing, or material location tracking are prevalent in storage management methods.

Regarding material location tracking systems, conventional approaches are mostly performed with radio frequency identification (RFID). However, if the RFID is employed in a warehouse for storing metallic materials, RF signals may be scattered by these metallic materials. As a result, a reader cannot track correct material locations, and material lists are thus unable to be established correctly.

Therefore, conventional material location tracking systems are far from ideal, improvements are required.

SUMMARY

The disclosure provides a carrier tracking method. The carrier tracking method comprises following steps: disposing an optical recognizable mark on a mobile carrier operating in a predetermined space, in which the optical recognizable mark is associated with information of materials carried by the mobile carrier; capturing, by at least one optical capturing device, an image of the predetermined space; determining, by a computing unit, an optical recognized coordinate corresponding to the optical recognizable mark being captured in the images; converting, by the computing unit, the optical recognized coordinate to a real-space coordinate in the predetermined space; and associating, by the computing unit, the real-space coordinate with the information of materials and locating the mobile carrier.

Another aspect of present disclosure is to provide a carrier tracking system applied on a predetermined space. A mobile carrier disposed with an optical recognizable mark operates in the predetermined space. The carrier tracking system comprises at least one optical capturing device and a computing unit. The at least one optical capturing device is fixedly arranged in the predetermined space. The at least one optical capturing device is configured to capture an image of the predetermined space. The computing unit is communicatively coupled to the at least one optical capturing device. The computing unit is configured to determine an optical recognized coordinate corresponding to the optical recognizable mark being captured in the images, in which the optical recognizable mark is associated with information of materials carried by the mobile carrier. The computing unit is further configured to convert the optical recognized coordinate to a real-space coordinate in the predetermined space, associate the real-space coordinate with the information of materials, and locate the mobile carrier.

Accordingly, embodiments of present disclosure provide the carrier tracking system and the carrier tracking method as an improvement to conventional arts. With present disclosure, tracking failures due to influence of metallic materials can be avoided.

BRIEF DESCRIPTION OF THE DRAWINGS

Present disclosure can be more fully understood by reading the following detailed description of the embodiment, with reference made to the accompanying drawings as follows.

DETAILED DESCRIPTION

Figure 1:
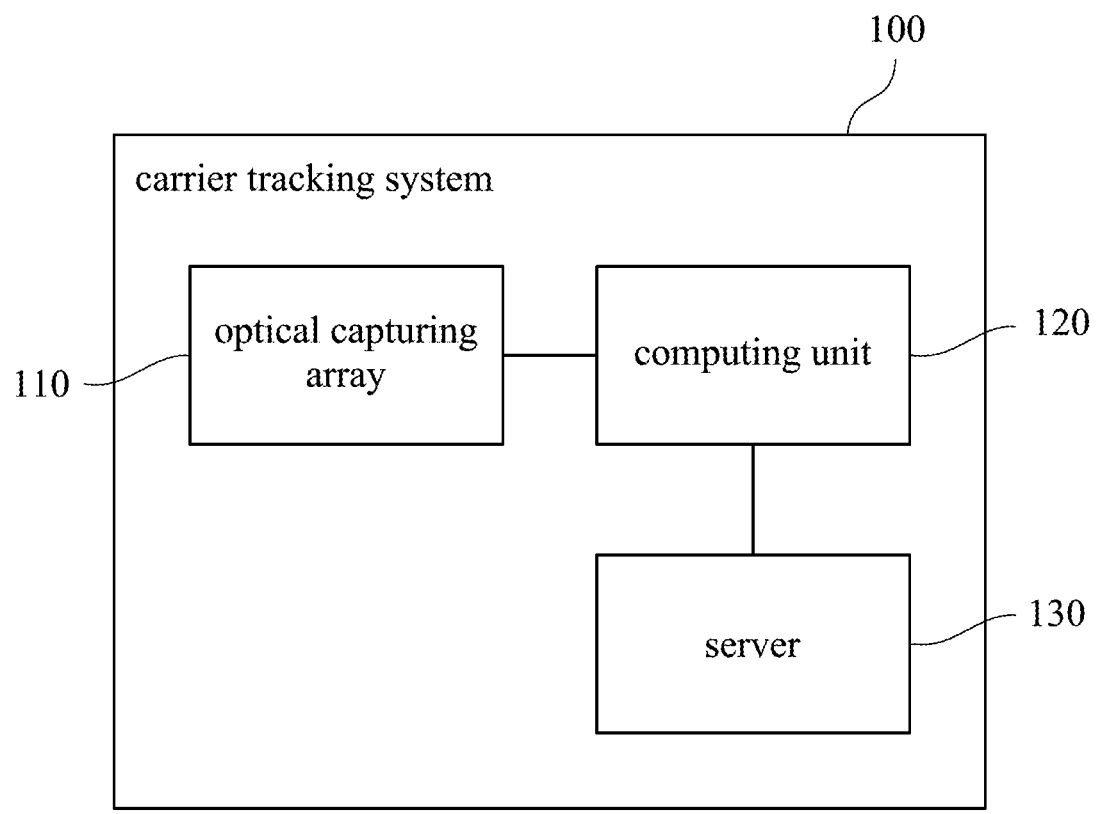
FIG. 1 is a schematic diagram of a carrier tracking system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram of a carrier tracking system according to some embodiments of the present disclosure. As shown in FIG. 1, in the embodiment, a carrier tracking system 100 includes an optical capturing array 110, a computing unit 120, and a server 130. The optical capturing array 110 is disposed in a predetermined space, and the computing unit 120 is communicatively coupled to the optical capturing array 110. It is noted that the term "communicatively coupling" used herein can be referred to coupling in physically or non-physically manners. For example, in one case, the computing unit 120 and the optical capturing array 110 can be coupled to a network via wireless communication (e.g. Wi-Fi) for bi-directional information exchange. In another case, the computing unit 120 and the optical capturing array 110 can be coupled to the network via cable, physically, for bi-directional information exchange. It is to say, in some embodiments, if the computing unit 120 and the optical capturing array 110 are communicatively coupled, the computing unit 120 can be settled in a place other than the predetermined space.

In some applicable embodiments, the predetermined space can be a material warehouse having a determined size. Plural mobile carriers are in operation in the material warehouse. In general, by workers or machines, the mobile carriers can be moved from place to place in the predetermined space. Some specific materials or material container are placed on each mobile carrier. Therefore, in order to improve storage management of the material warehouse, the carrier tracking system 100 is configured to track movements or locations of these mobile carriers.

Figure 3:
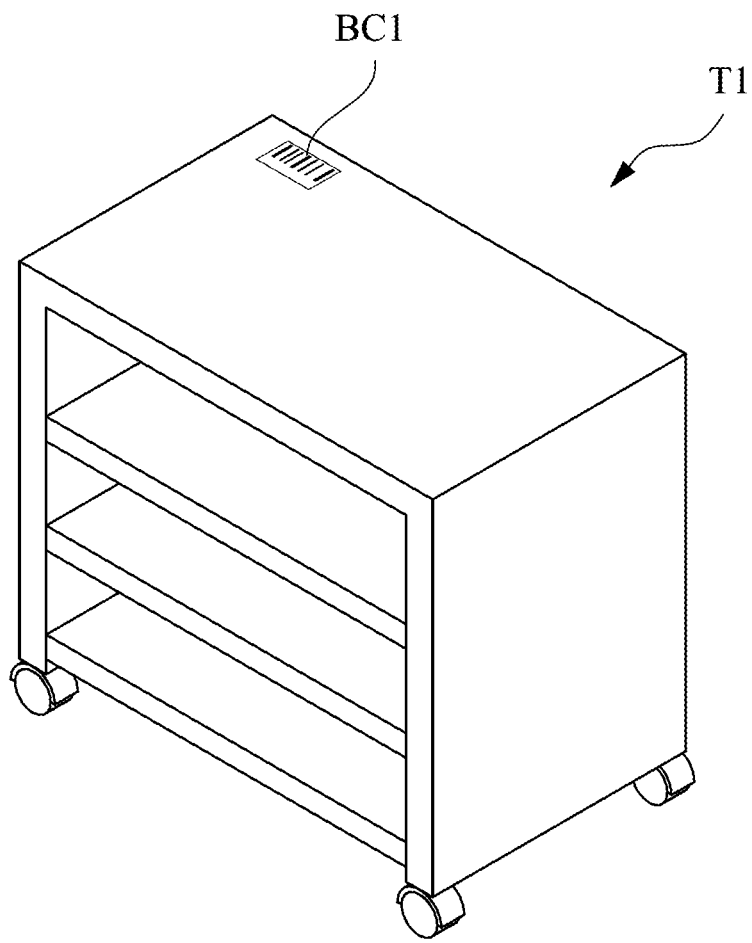
FIG. 3 is a schematic diagram of a mobile carrier according to some embodiments of the present disclosure.

In some embodiments, a unique optical recognizable mark is arranged on each of the mobile carriers (e.g. the carrier shown in FIG. 3). For instance, the optical recognizable mark can be a tag associated with coded information, such as Bar code or QR code. In general, the optical recognizable mark can be arranged on specific parts (e.g. top or lateral) of the mobile carrier that makes them to be read easily. For example, when the optical recognizable mark is arranged in a corner on the top of mobile carriers, it would be good for the optical capturing array 110 to read the optical recognizable mark. It is noted that the optical recognizable marks arranged on the mobile carriers are associated with material information indicating materials that the mobile carriers carry. It is to say, when one optical recognizable mark of a specific mobile carrier is read, the material information can be obtained. The material information may include material names, material types, material amounts, or container amounts on that specific mobile carrier. It is further noted that the optical recognizable marks can be arranged on a surface of the mobile carrier in several approaches, such as being printed, being displayed on a display, or being with E-Ink and other updateable intermediates, as long as the optical capturing array 110 can read them.

Figure 4:
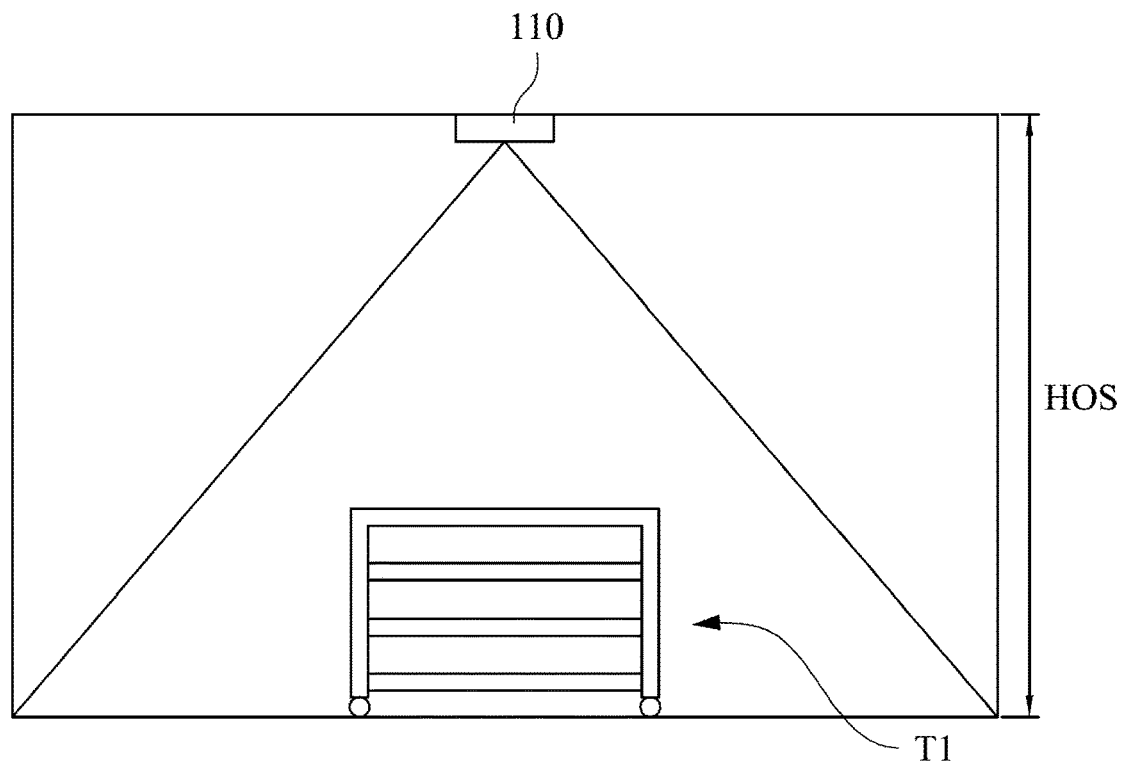
FIG. 4 is a schematic diagram showing the optical capturing array captures images of the predetermined space according to some embodiments of the present disclosure.

In some embodiments, the optical capturing array 110 includes at least one optical capturing device (e.g. camera, video recorder, one or more image sensing circuits). An alignment of the at least one optical capturing device forms the optical capturing array 110. In some embodiments, the optical capturing array 110 is arranged on top of the predetermined space, in order to capture images of some specific areas in the predetermined space. In some embodiments, the optical capturing array 110 is arranged on a center of the ceiling of the predetermined space (as shown in FIG. 4). In this case, a field of view of the optical capturing array 110 can cover the entire predetermined space. However, it is noted that the places where the optical capturing array 110 is arranged are not limited to the above embodiments.

In some embodiments, a moving mechanism can be arranged between the optical capturing array 110 and the ceiling of the predetermined space. Operations of the moving mechanism may provide the optical capturing array 110 capabilities of traveling on the ceiling of the predetermined space, instead of being fixed in a place. In some embodiments, each optical capturing device in the optical capturing array 110 can be rotated in a certain degree so that the field of view of the optical capturing array 110 can be oriented to some specific areas in the predetermined space.

In some embodiments, the computing unit 120 includes, for example but not limited to, a single processing unit and a combination of plurality microprocessors electrically connected to internal memories or external memories. The internal or external memories include volatile and non-volatile memories. The computing unit 120 is configured to fetch a set of programs from these internal or external memories, to execute the set of programs, and to perform predetermined processes according to these programs. In some embodiments, the computing unit 120 can be, but not limited to, formed by one or a plurality processing circuits.

In the embodiment, the computing unit 120 is communicatively coupled to the server 130 which has an inventory list stored therein. The inventory list includes abovementioned material information regarding materials that each mobile carrier carried. Since computing unit 120 is communicatively coupled to the server 130, the computing unit 120 can execute mentioned programs to access the inventory list from the server 130, and further access said material information regarding materials each mobile carrier carried. For better understandings of the operations of the carrier tracking system 100, references can be made to FIG. 2.

Figure 2:
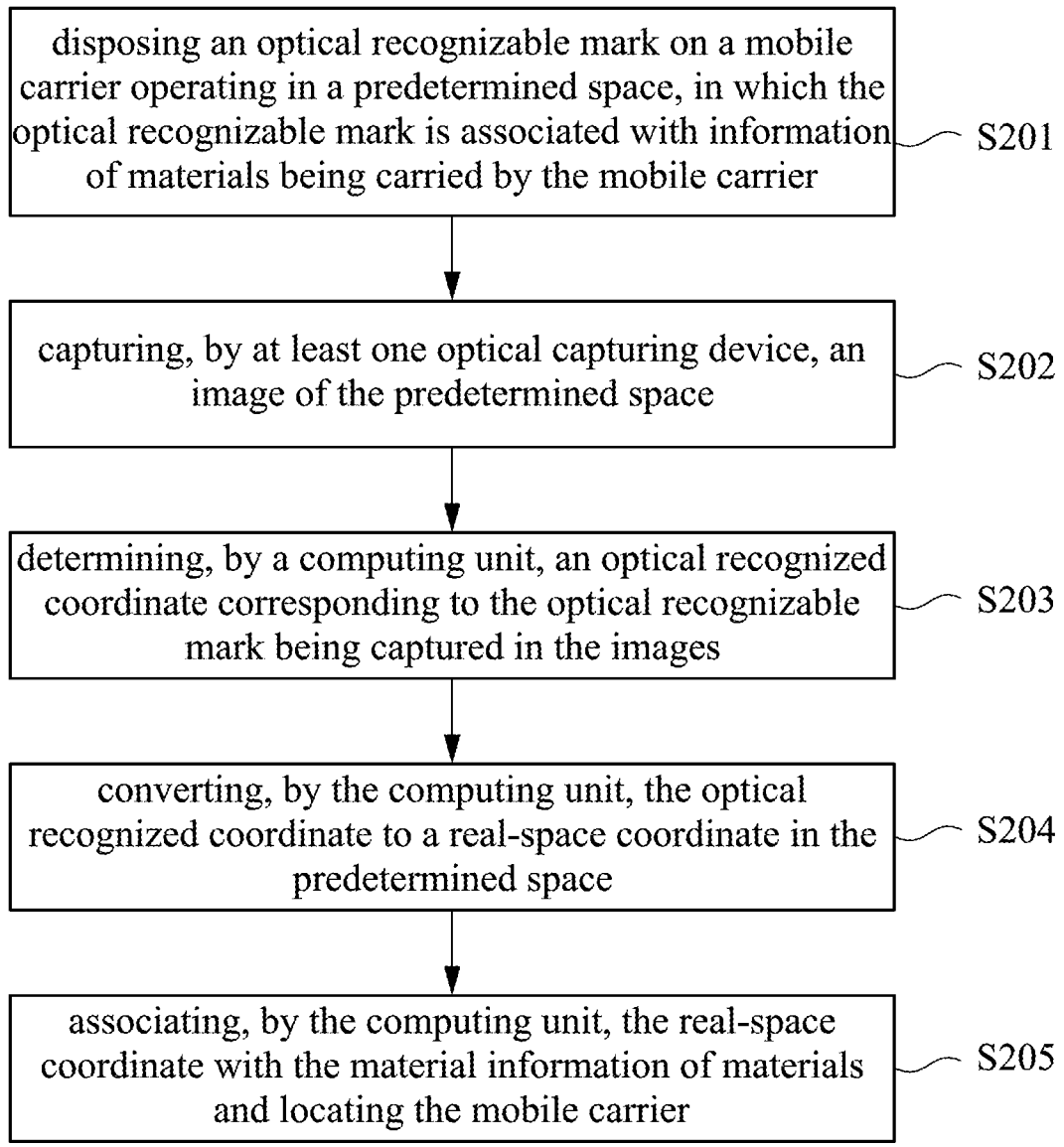
FIG. 2 is a flow chart of a carrier tracking method according to some embodiments of the present disclosure.

FIG. 2 is a flow chart of a carrier tracking method according to some embodiments of the present disclosure. In some embodiments, a carrier tracking method 200 can be executed by the carrier tracking system 100 shown in FIG. 1. In some embodiments, detail steps of the carrier tracking method 200 are recited in following paragraphs.

In step S201: disposing an optical recognizable mark on a mobile carrier operating in a predetermined space, in which the optical recognizable mark is associated with information of materials carried by the mobile carrier.

As shown in FIG. 1, in some embodiments, in order to track movements or locations of each mobile carrier operating in the predetermined space, the optical recognizable mark disposed on each mobile carrier is unique, and each optical recognizable mark is associated with information of the materials that mobile carrier carried.

For better understandings of step S201, references can be made to FIG. 3. FIG. 3 is a schematic diagram of a mobile carrier according to some embodiments of the present disclosure. One of the mobile carriers, a material trolley T1, operating in the predetermined space is illustrated in FIG. 3. As shown in FIG. 3, the material trolley T1 has a plurality of layers provided to load materials or material containers. It is noted that on top of the material trolley T1 is a flat surface. In a corner of the flat surface a two-dimensional barcode BC1, which is the optical recognizable corresponding to the material trolley T1, is arranged. It is noted that a size of the two-dimensional barcode BC1 is predetermined. In some embodiments, for better computational efficiency, sizes of the optical recognizable mark of these mobile carriers can be identical. It is understood that FIG. 3 is an available embodiment for exemplary purpose but not to limit the mobile carrier of present disclosure. The mobile carriers in operation can be in different types but each of them is arranged with one optical recognizable mark as mentioned. Based on user's demands, styles of the mobile carriers and where the optical recognizable marks being arranged on these carriers are subject to change.

In step S202: capturing, by at least one optical capturing device, an image of the predetermined space.

For better understanding of step S202, referring to FIG. 4. FIG. 4 is a schematic diagram showing the optical capturing array 110 captures images of the predetermined space according to some embodiments of the present disclosure. As shown in FIG. 4, in the embodiment, the optical capturing array 110 is arranged on the ceiling of the predetermined space, distanced from the ground in a height HOS, in order to capture images of a target area of the predetermined space. In this embodiment, the material trolley T1 is operating in the predetermined space. As shown in FIG. 4, the optical capturing array 110 is configured to obtain a plurality of images of the predetermined space in a set of time points. Each pair of two continuous time points determines a time interval (e.g. 1 second between a pair of time points). In other words, the optical capturing array 110 can capture the images of the predetermined space during some predetermined time intervals. If each time interval is predetermined shorter, it means that the optical capturing array 110 captures images of the predetermined space in a higher frequency. As long as the the material trolley T1 staying in the target area of the predetermined space, the material trolley T1 can be captured in the images taken by the optical capturing array 110.

In step S203 determining, by a computing unit, an optical recognized coordinate corresponding to the optical recognizable mark being captured in the images.

As shown in FIG. 1 and FIG. 4, in the embodiment, the optical capturing array 110 can capture images, and the images can be transmitted from the optical capturing array 110 to the computing unit 120. The computing unit 120 is configured to determine an optical recognized coordinate indicating a position, onto which the optical recognizable mark is optically projected, in an imaging surface of the optical capturing array 110. The imaging surface, for example, can be a charge-coupled device (CCD) of an optical capturing device in the optical capturing array 110. When the optical capturing device is operated to capture images of the predetermined space, lights from the predetermined space are projected onto the charge-coupled device of the optical capturing device via a lens, and the charge-coupled device can turn the electrons transmitted on capacitor arrays into a set of voltage signals. These voltage signals represent information corresponding to the image captured by said optical capturing device. In other words, the optical recognized coordinate represents the spots that the optical recognizable being captured on the optical sensing area of the optical capturing array 110. In this case, recognition of where the optical recognizable mark is projected onto the capacitor arrays allows the computing unit 120 to determine the optical recognized coordinate corresponding to the optical recognizable mark. It is noted that, though the term "coordinate" above is being used in singular form, it may refer to a "coordinate point" determined by a set of values, such as (X1, Y1) or (X1, Y1, Z1).

Figure 5:
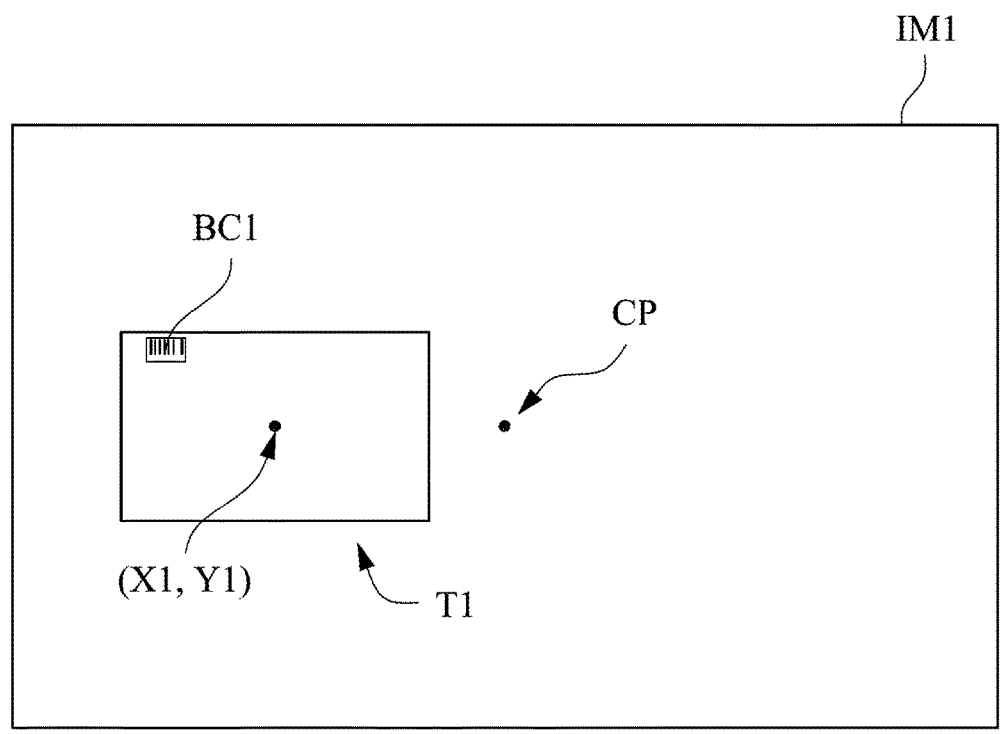
FIG. 5 is a schematic diagram showing an image captured by the optical capturing array according to some embodiments of the present disclosure.

For instance, as shown in FIG. 3, since the two-dimensional barcode BC1 is disposed on the flat surface on top of the material trolley T1, images captured by the optical capturing array 110 shown in FIG. 3 may carry information about the top of the material trolley T1. For better understandings, reference is made to FIG. 5. FIG. 5 is a schematic diagram showing an image captured by the optical capturing array 110 according to some embodiments of the present disclosure. FIG. 5 illustrates an image IM1 captured by the optical capturing device of the optical capturing array 110 at a specific time point. The flat surface on top of the material trolley T1 is shown in the image IM1. It is noted that the two-dimensional barcode BC1 is also captured in the image IM1. As mentioned in foregoing embodiment, when the computing unit 120 receives the image IM1, the computing unit 120 can determine the optical recognized coordinate corresponding to the optical recognizable mark.

In FIG. 5, a virtual center point CP of the image IM1 is illustrated in the embodiment. It is noted that the virtual center point CP is not a visible tag in the captured image IM1, and it only shows where a first reference point is located on the CCD of the optical capturing device. For instance, the first reference point can be an actual center of the CCD of the optical capturing device. In this case, since the size of the two-dimensional barcode BC1 is known, the computing unit 120 can detect a position that a point of the two-dimensional barcode BC1 is projected on the CCD of the optical capturing device. The computing unit 120 can then determine a relative distance from that position to the virtual center point CP. A determination of the optical recognized coordinate (X1, Y1) can be done according to the relative distance. The optical recognized coordinate (X1, Y1) represents the point of the two-dimensional barcode BC1 being projected on the imaging surface (i.e. CCD) of the optical capturing device.

In step S204: converting, by the computing unit, the optical recognized coordinate to a real-space coordinate in the predetermined space.

When a position of the optical capturing array 110 is fixed, the optical capturing device of the optical capturing array 110 is oriented to a fixed place on the ground of the predetermined space. In this case, the first reference point on the CCD (i.e. the virtual center point CP in image IM1 in FIG. 5) of the optical capturing device also is pointed to a fixed place. Under this condition, given the height HOS from the optical capturing array 110 to the ground of the predetermined space, the computing unit 120 can convert the optical recognized coordinate (X1, Y1) to a base plane coordinate. It is noted that, in the embodiment, the base plane herein refers to the ground plane (i.e. floor) of the predetermined space (i.e. the material warehouse).

Figure 6:
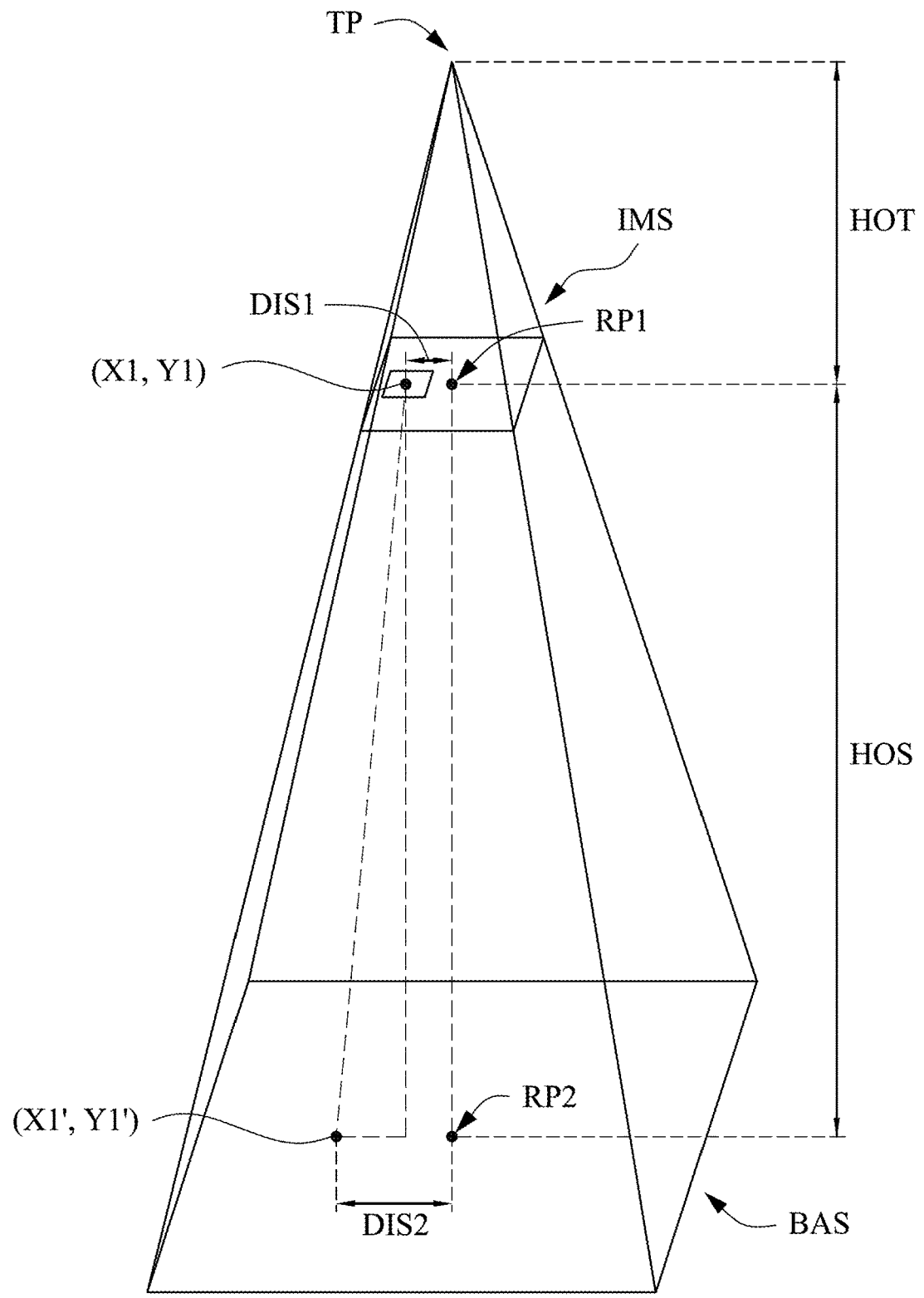
FIG. 6 is a schematic diagram showing a relation of the imaging surface and the ground of the predetermined space according to some embodiments of the present disclosure.

For better understandings, referring to FIG. 6, which is a schematic diagram showing a relation of the imaging surface and the ground of the predetermined space according to some embodiments of the present disclosure. In the embodiment, FIG. 6 illustrates an imaging surface IMS, which is actually a plane forming by the CCD of the optical capturing device. The first reference point RP1 shown in the embodiment is corresponding to the virtual center point CP in the image IM1 shown in FIG. 5. FIG. 6 also illustrates a base plane BAS. The base plane BAS shows an area that a field of view of the optical capturing device may cover on the ground of the predetermined space. The optical capturing device is fixedly oriented to the predetermined space, thus the first reference point RP1 on the imaging surface IMS is projected on a second reference point RP2 on the base plane BAS. As shown in FIG. 6, given the height HOS and the correspondence of reference points RP1-RP2, the computing unit 120 can calculate a projection of optical recognized coordinate (X1, Y1) on the base plane BAS, which is a base plane coordinate (X1', Y1'), according to triangle similarities. More specifically, as shown in FIG. 6, distance between a peak TP of the tetrahedron and the first reference point RP1 is represented as a first height HOT. Distance between the optical recognized coordinate (X1, Y1) and the first reference point RP1 is represented as a distance DIS1. Distance between the base plane coordinate (X1', Y1') and the second reference point RP2 is represented as a distance DIS2. When the computing unit 120 obtains above heights and distances, a ratio of the height HOT and a sum of (HOT+HOS) can be obtained. The ratio should be equal to a ratio of the distance DIS1 and the distance DIS2. Accordingly, the computing unit 120 can obtain the base plane coordinate (X1', Y1'), which represents a position of the two-dimensional barcode BC1 on the base plane BAS. In other words, the base plane coordinate of the two-dimensional barcode BC1 represent where the two-dimensional barcode is located with respect to the floor of the predetermined space.

It is noted that the base plane BAS illustrated in FIG. 6 only covers a part of the ground of the predetermined space. In this case, according to a correspondence between another reference point in the predetermined space and the base plane BAS, the computing unit 120 can further convert the base plane coordinate (X1', Y1') to real-space coordinate of the predetermined space. The real-space coordinate represents a position of the two-dimensional barcode BC1 on the entire ground of the predetermined space. For example, said another reference point can be an entrance, an exit, a corner of the predetermined space, or a shelf in the predetermined space. As a distance between one of these reference points and the second reference point RP2 on the base plane BAS is fixed, the computing unit 120 can convert the base plane coordinate (X1', Y1') to the real-space coordinate of the predetermined space based on the reference of distances.

In foregoing embodiments, as the optical capturing array 110 is fixedly arranged on the ceiling of the predetermined space, a relationship between the first reference point RP1 on the imaging surface IMS and the second reference point RP2 on the base plane BAS can be obtained. The conversion processes executed by the computing unit 120 is based on abovementioned relationship. In some embodiments, a user of the carrier tracking system 100 can select other physical objects being fixed on the ground of the predetermined space as references. In this case, these physical objects may be captured in the images taken by the optical capturing array 110. In the same manner, to perform similar conversion processes as above, the computing unit 120 can use a relationship between these physical objects or a relationship between the physical objects and the optical capturing array 110.

In step S205: associating, by the computing unit, the real-space coordinate with the material information of materials and locating the mobile carrier.

As shown in FIG. 3 to FIG. 6, the computing unit 120 can receive images captured by the optical capturing device of the optical capturing array 110, and perform a series of coordinate conversion processes to determine where the two-dimensional barcode BC1 is located on the ground of the predetermined space. However, it is noted that the computing unit 120 is also configured to read the two-dimensional barcode BC1 when the coordinate conversion processes are performed. The computing unit 120 may access the inventory list stored in the server 130 and find out that the two-dimensional barcode BC1 is corresponding to the material trolley T1. The computing unit 120 may further perform an update to record the real-space coordinate as part of the material information of the material trolley T1. Thus, the real-space coordinate are associated with the material information of the material trolley T1. In order to locate the material trolley T1 in the predetermined space, a worker can access the server 130 via some communication device to request for the material information of the material trolley T1. Since the material information of the material trolley T1 has associated with the real-space coordinate, the worker can find the material trolley T1 according to the real-space coordinate. In this way a location of the material trolley T1 in the predetermined space can be obtained.

In above embodiments, a case based on one optical capturing device of the optical capturing array 110 is provided. However, for better efficiency of carrier tracking method 200, an association of the optical capturing devices in the optical capturing array 110 may be performed in some embodiments. For instance, the optical capturing devices in the optical capturing array 110 may have overlapped field of views, then the material trolley T1 and the two-dimensional barcode BC1 may be simultaneously captured in images taken by different optical capturing devices. In this case, each optical capturing device may perform abovementioned steps S202-S205, respectively, to get real-space coordinate of the material trolley T1. Then, the computing unit 120 may collect multiple real-space coordinate corresponding to the material trolley T1 and perform a calibration process to get accurate real-space coordinate. In some cases, if images captured by a few optical capturing devices are bad due to angles or reflections, images captured by other capturing devices can be used as backups to obtain the real-space coordinate of the material trolley T1.

In some embodiments, when the height HOS that the optical capturing array 110 distanced from the ground of the predetermined space is 1 meter (m), the size of the two-dimensional barcode BC1 disposed on the material trolley T1 can be 36 square centimeters (with 12 cm in length, 3 cm in width). The height HOS and the size of the two-dimensional barcode BC1 can provide decent recognition accuracy for the computing unit 120. Moreover, since the size of the two-dimensional barcode BC1 is known in this case, the computing unit 120 can perform the coordinate conversion according to the size.

In some embodiments, the optical capturing devices in the optical capturing array 110 can be configured with a resolution of 2048*1536 pixels, and the recognition accuracy in this case is over 95%. However, a high resolution configuration of the optical capturing devices demands higher computation times.

As mentioned, in some embodiments, the optical capturing array 110 can be moved on top of the predetermined space via operations of the moving mechanism. It is noted that, in foregoing embodiments, the carrier tracking system 100 is fixedly arranged on the ceiling of the predetermined space. However, in the embodiment that the optical capturing array 110 can be moved on the ceiling of the predetermined space, the first reference point RP1 on imaging surface IMS remains the same. In this case, the computing unit 120 can determine a displacement of the base plane BAS according to a displacement of the optical capturing array 110, and a displacement of the second reference point RP2 can therefore be calculated. Then, given a relative distance between the second reference point RP2 and said another reference point in the predetermined space, the computing unit 120 can perform the conversion process to calculate the real-time coordinate corresponding to that optical recognized coordinate. Furthermore, in some embodiments, the optical capturing devices in the optical capturing array 110 can be rotated in a certain degrees. Given above exemplary embodiment of the carrier tracking system 100 fixed on the ceiling of the predetermined space, it is understood that a conversion process corresponding to a rotated optical capturing array 110 can be done by a triangle similarity calculation with different types of triangles. Still, the real-time coordinate corresponding to the optical recognized coordinate can be obtained.

In foregoing embodiments, one material trolley T1 is provided for example. However, in some embodiments, the computing unit 120 may recognize optical recognizable marks on multiple mobile carriers from the images captured by the optical capturing array 110 simultaneously and perform a conversion to get real-time coordinate of these position optical recognizable marks. In this case, an association of the optical capturing array 110 and the computing unit 120 may establish tracking to multiple mobile carriers in the predetermined space.

In aforementioned embodiments, the computing unit 120 is configured to read the two-dimensional barcode BC1, to perform the coordinate conversion process correspondingly, to record the real-time coordinate as material information of the material trolley T1, and to locate the material trolley T1. However, as mentioned, the optical capturing array 110 can capture images of the predetermined space according to multiple time intervals. It is to say, the computing unit 120 can perform the carrier tracking method 200 repeatedly to obtain the real-time coordinate of the material trolley T1 in these time intervals. The real-time coordinate of the material trolley T1 in the time intervals can be integrated as a trail of the material trolley T1 in the predetermined space. Moreover, the real-time coordinate can be provided as backups. For example, if the computing unit 120 fails to obtain the optical recognized coordinate of the material trolley T1 in a specific time interval, the computing unit 120 can generate the real-space coordinate of that specific time interval according to the optical recognized coordinate obtained in the time intervals prior to or after that specific time interval.

In one embodiment, the computing unit 120 can take the optical recognized coordinate obtained in the time interval prior to that specific time interval as the optical recognized coordinate corresponding to that specific time interval, and calculate the real-space coordinate of the material trolley T1 accordingly. For example, let say the computing unit 120 determines first optical recognized coordinate of the material trolley T1 in a first time point. If the computing unit 120 fails to determine new optical recognized coordinate of the material trolley T1 in a second time point, the computing unit 120 can use the first optical recognized coordinate as the new optical recognized coordinate in the second time point. It this case, the computing unit 120 can still convert the optical recognized coordinate to the real-time coordinate successfully.

In one embodiment, the computing unit 120 can perform an interpolation calculation according to optical recognized coordinate obtained in several time intervals to get the optical recognized coordinate corresponding to that specific time interval. Then, the conversion for the real-time coordinate can be performed. For example, let say the computing unit 120 determines first optical recognized coordinate of the material trolley T1 in a first time point and determines second optical recognized coordinate for the material trolley T1 in a second time point. If the computing unit 120 fails to determine new optical recognized coordinate of the material trolley T1 in a third time point, the computing unit 120 can calculate a difference between the first optical recognized coordinates and the second optical recognized coordinate and calculate a difference between the first time point and the second time point. According to the time difference and coordinate differences, the computing unit 120 can estimate the new optical recognized coordinate of the material trolley T1 in the second time point. With the new optical recognized coordinate, the computing unit 120 can convert the optical recognized coordinate to the real-time coordinate successfully.

In some embodiments, to manage the warehouse, the user of the carrier tracking system 100 can apply some management rules based on the real-time coordinate. The management rules can be associated with the material information and stored in the server 130. For instance, the user of the carrier tracking system 100 can determine restriction zones in the predetermined space and regulate that some of the mobile carriers are restricted in these restriction zones. As mentioned, the computing unit 120 can track trails of the mobile carriers in multiple time intervals. The computing unit 120 can update the material information stored in the server 130, and the computing unit 120 can further determine if the mobile carriers enter/leave the restriction zones according to the material information and trails of the mobile carriers. Once the computing unit 120 determines that the mobile carriers enter/leave the restriction zones, the computing unit 120 generates an anomaly alert. The computing unit 120 can further send the anomaly alert to the user of the carrier tracking system 100 as a notification.

According to foregoing embodiments, a carrier tracking system and a carrier tracking method are provided in present disclosure. The carrier tracking system and the carrier tracking method can provide decent tracking accuracy in a warehouse stored with some metallic materials. Some embodiments of present disclosure provide backup mechanisms for recognition failure because of angle or reflection. Some embodiments of present disclosure provide applications for the user to locate the mobile carriers.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A carrier tracking method, comprising:
    disposing an optical recognizable mark on a mobile carrier operating in a predetermined space, in which the optical recognizable mark is associated with information of materials carried by the mobile carrier;
    capturing, by at least one optical capturing device, an image of the predetermined space;
    recognizing, by a computing unit, an optical recognized coordinate corresponding to the optical recognizable mark being captured in the image;
    converting, by the computing unit, the optical recognized coordinate to a real-space coordinate in the predetermined space according to at least one of reference point among the predetermined space; and
    associating, by the computing unit, the real-space coordinate with the information of materials and locating the mobile carrier;
    generating, by the computing unit, a trail of the mobile carrier according to the real-space coordinate converted in each of a plurality of time intervals; and determining, by the computing unit, whether to generate an alert according to the information of materials and the trail of the mobile carrier, wherein the information of materials corresponds to at least one restriction zone in the predetermined space, and the computing unit generates the alert in response to determining the trail of the mobile carrier entering/leaving the at least one restriction zone according to the information of materials and the trail of the mobile carrier.

2. The carrier tracking method of claim 1, further comprising:

in response to a failure to recognize the optical recognized coordinate in a first time interval of a plurality of time intervals, generating, by the computing unit, the real-space coordinate of the first time interval according to the optical recognized coordinate of a second time interval of the plurality of time intervals, wherein the first time interval and the second time interval are successive time intervals.

3. The carrier tracking method of claim 1, wherein the step of converting the optical recognized coordinate to the real-space coordinate in the predetermined space comprises:

determining the optical recognized coordinate, onto which the optical recognizable mark is projected, in an imaging surface of the at least one optical capturing device;

calculating a base plane coordinate on a base plane of the predetermined space according to a distance between the at least one optical capturing device and the base plane; and converting the base plane coordinate to the real-space coordinate according to a position of at least one reference point on the base plane.

4. The carrier tracking method of claim 1, wherein the optical capturing device is fixedly arranged in the predetermined space at a predetermined height to a ground of the predetermined space, the optical capturing device forms a base plane on the ground of the predetermined space which corresponds to an area that a field of view of the optical capturing device covers on the ground of the predetermined space, and the step of converting the optical recognized coordinate to the real-space coordinate in the predetermined space comprises:

determining the optical recognized coordinate onto which the optical recognizable mark is projected in an imaging surface of the optical capturing device;

determining a location of a first reference point in the image of the predetermined space captured by the optical capturing device;

determining a location of a second reference point on the base plane by projecting the first reference point in the image on the base plane;

calculating a projection of the optical recognized coordinate on the base plane as a base plane coordinate on the basis of the predetermined height of the optical capturing device to the ground of the predetermined space, the first reference point, and the second reference point, wherein the base plane coordinate represents the real-space coordinate of the optical recognizable mark in the predetermined space.

5. The carrier tracking method of claim 4, wherein the first reference point is determined to be at a virtual center point of the image.

6. The carrier tracking method of claim 4, wherein the first reference point on the imaging surface is projected onto a second reference point on the base plane.

7. A carrier tracking system, applied in a predetermined space where a mobile carrier having an optical recognizable mark is in operation, and the carrier tracking system comprising:

at least one optical capturing device, fixedly arranged in the predetermined space, the at least one optical capturing device configured to capture an image of the predetermined space; and a computing unit, communicatively coupled to the at least one optical capturing device, the computing unit configured to recognize optical recognized coordinate corresponding to the optical recognizable mark being captured in the image, wherein the optical recognizable mark is associated with information of materials carried by the mobile carrier, the computing unit is further configured to convert the optical recognized coordinate to real-space coordinate in the predetermined space according to at least one of reference point among the predetermined space, to associate the real-space coordinate with the information of materials, and to locate the mobile carrier, wherein the computing unit is configured to generate a trail of the mobile carrier according to the real-space coordinate converted in each of a plurality of time intervals, and determine whether to generate an alert according to the information of materials and the trail of the mobile carrier, wherein the information of materials corresponds to at least one restriction zone in the predetermined space, and the computing unit generates the alert in response to determining the trail of the mobile carrier entering/leaving the at least one restriction zone according to the information of materials and the trail of the mobile carrier.

8. The carrier tracking system of claim 7, wherein in response to a failure to recognize the optical recognized coordinate in a first time interval of a plurality of time intervals, the computing unit configured to generate the real-space coordinate of the first time interval according to the optical recognized coordinate of a second time interval of the plurality of time intervals, in which the first time interval and the second time interval are successive time intervals.

9. The carrier tracking system of claim 7, wherein the computing unit further configured to determine the optical recognized coordinate, onto which the optical recognizable mark is projected, in an imaging surface of the at least one optical capturing device, to calculate base plane coordinate on a base plane of the predetermined space according to a distance between the at least one optical capturing device and the base plane, and convert the base plane coordinate to the real-space coordinate according to a position of at least one reference point on the base plane.

* * * * *